No. 793,925.

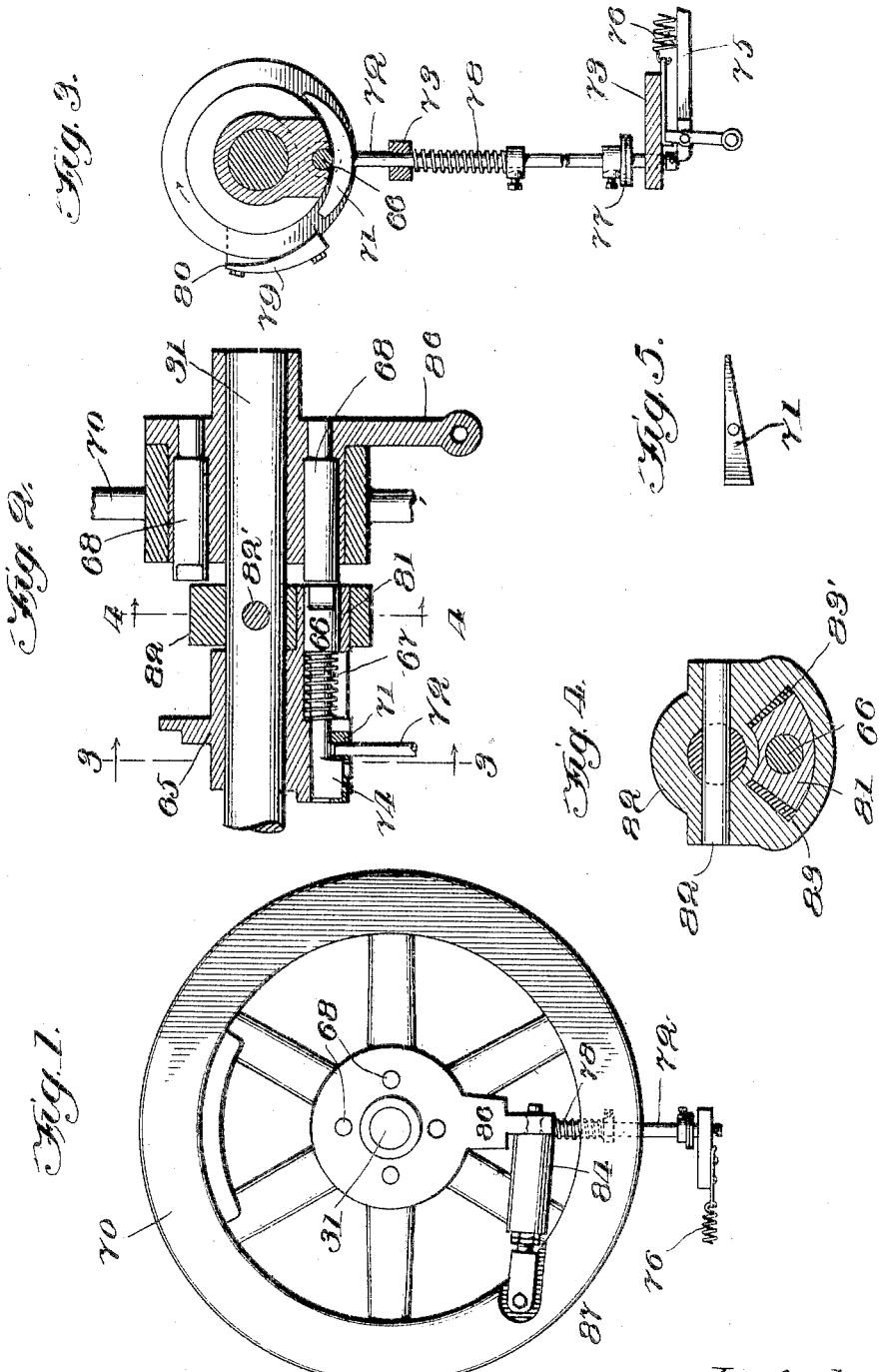

Patented July 4, 1905.

UNITED STATES PATENT OFFICE.

JOSEPH S. DUNCAN, OF CHICAGO, ILLINOIS, ASSIGNOR TO ADDRESSO-GRAPH COMPANY, OF CHICAGO, ILLINOIS, A CORPORATION OF ILLINOIS.

CLUTCH MECHANISM.

SPECIFICATION forming part of Letters Patent No. 793,925, dated July 4, 1905.

Original application filed December 17, 1902, Serial No. 135,656. Divided and this application filed April 27, 1903. Serial No. 154,518.

*To all whom it may concern:*

Be it known that I, JOSEPH S. DUNCAN, a citizen of the United States, residing at Chicago, in the county of Cook and State of Illinois, have invented certain new and useful Improvements in Clutch Mechanism, of which the following is a specification.

This application is a division of my application, Serial No. 135,656, filed December 17, 1902, for a machine for making printing-plates.

The object of the invention is to lessen the noise and shock incidental to the operation of clutches by providing an improved form of clutch constructed and arranged to operate in or about the manner herein shown and described.

In the accompanying drawings I have illustrated one form in which the invention may be embodied.

Referring to the drawings, Figure 1 is a side elevation. Fig. 2 is a longitudinal sectional view. Fig. 3 is a sectional view on the line 3 3 of Fig. 2 and showing also one means for operating the clutch. Fig. 4 is a sectional view on the line 4 4 of Fig. 2. Fig. 5 is a detail plan view of the shoe 71.

In the drawings like numerals of reference designate corresponding parts in the several figures, and referring thereto one clutch member 65 is mounted on the power-shaft 31 and provided with a locking-bolt 66, which is constantly under the tension of a spring 67, tending to thrust it forward into engagement with one of the pins 68 on the other clutch member 69, which carries the belt-wheel 70 and is loose on the power-shaft. This locking-bolt is withdrawn from engagement with the pin 68 and held in retracted position by means of a shoe 71, which is reduced and pointed at its forward end, Fig. 5, and adapted to engage the offset 74 at the rear end of the locking-bolt as the clutch member revolves to withdraw the bolt. Various means may be employed for operating the retracting-shoe, and I have mounted this shoe on a spring-stem 72, guided in fixed parts 73 and normally held up in engagement with the bolt 66 to hold it in retracted position, Fig. 2, by means of a trip-rod 75, which is operated in any suitable manner and is normally held by a spring 76 in engagement with the lower end of the stem 72 and supporting the same, Fig. 3. A collar 77 is adjustably arranged on the stem 72 and faced with rubber to limit the downward movement of the stem, which is effected by the spring 78 when the trip-rod is released from engagement with the stem.

My improved clutch may be used on machines which operate intermittently or for an indefinite period; but in the drawings I have chosen to show a clutch adapted to operate intermittently. To release the clutch after one complete revolution of the shaft, I provide a pick-up plate 79, having a cam-face 80 on the clutch member 65 to engage the shoe and raise it from its lowered position into engagement with the offset end of the locking-bolt, and the construction is such that the shaft will be automatically brought to rest after each complete revolution.

To lessen the shock which generally occurs when a clutch is thrown, I provide the clutch member 65 with a lateral segmental extension 81, through which the locking-bolt passes, and which is arranged in an opening provided for it in a block 82, fastened to the power-shaft by a bolt 82' or in some other suitable manner. Between the sides of the extension 81 and the end walls of the opening in the block I provide packing 83 83', so that when the locking-bolt is engaged with a pin on the clutch member 69 the clutch member 65 will be locked on the power-shaft through the medium of the block 82, and the packing 83 will serve to lessen the shock and noise when the parts are so engaged. I also provide a resilient buffer in the connection between the belt-wheel and its clutch member 69 to further assist in lessening the shock when the two members are engaged, Fig. 1. This buffer comprises a block of rubber 84, carried on a spindle 85, which has its lower end loosely guided in an arm 86, rigid with the clutch member 69, and its upper end fastened to the rim of the pulley at 87. A stop 88 of some approved character, which may be a nut and a jam-nut, as shown, is provided on the spindle between the rubber block and the end thereof connected with the belt-wheel. The belt-wheel and its clutch member 69 will be constantly revolved, and when the two clutch members are engaged the rubber block, which is interposed between the clutch member 69 and the belt-wheel, will greatly reduce the shock on the machine and lessen the noise.

My improved clutch mechanism is simple in construction, and is especially useful in connection with intermittently-operated machines to prevent not only the noise but also the wear and tear due to successive shocks occasioned by throwing the clutch.

Without limiting myself to the exact construction and arrangement of parts herein shown and described, what I claim, and desire to secure by Letters Patent, is—

1. The combination of a power-shaft and a belt-wheel loosely mounted thereon, a clutch member mounted on said shaft, another clutch member traveling with the belt-wheel, a block rigidly mounted on the shaft between the two clutch members, a locking-bolt carried by one member and passing through the block to engage the other member, and a buffer arranged between said locking-bolt and the block.

2. The combination of a power-shaft and a belt-wheel loosely mounted thereon, a clutch member mounted on said shaft, another clutch member traveling with the belt-wheel, a block rigidly mounted on the shaft between the two clutch members, one of said members having a hollow extension projecting through said block, a locking-bolt carried by one member and passing through said extension to engage the other member, and a buffer located between the block and each end of said extension.

JOSEPH S. DUNCAN.

Witnesses:
 WM. O. BELT,
 HELEN L. PECK.